(12) United States Patent
Li et al.

(10) Patent No.: US 11,664,020 B2
(45) Date of Patent: *May 30, 2023

(54) SPEECH RECOGNITION METHOD AND APPARATUS

(71) Applicant: ALIBABA GROUP HOLDING LIMITED, Grand Cayman (KY)

(72) Inventors: Xiaohui Li, Hangzhou (CN); Hongyan Li, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 409 days.

This patent is subject to a terminal disclaimer.

(21) Appl. No.: 16/908,419

(22) Filed: Jun. 22, 2020

(65) Prior Publication Data

US 2020/0320977 A1 Oct. 8, 2020

Related U.S. Application Data

(60) Division of application No. 15/969,926, filed on May 3, 2018, now Pat. No. 10,741,170, which is a
(Continued)

(30) Foreign Application Priority Data

Nov. 6, 2015 (CN) .......................... 201510752397.4

(51) Int. Cl.
*G10L 15/00* (2013.01)
*G10L 15/187* (2013.01)
(Continued)

(52) U.S. Cl.
CPC ............ *G10L 15/187* (2013.01); *G10L 15/02* (2013.01); *G10L 15/063* (2013.01); *G10L 15/26* (2013.01);
(Continued)

(58) Field of Classification Search
CPC ......... G10L 15/00; G10L 15/22; G10L 15/08; G10L 15/14; G10L 15/142; G06F 40/20;
(Continued)

(56) References Cited

U.S. PATENT DOCUMENTS 6,076,056 A 6/2000 Huang et al.
6,278,973 B1 8/2001 Chung et al.
(Continued)

FOREIGN PATENT DOCUMENTS

CN 1979638 A 6/2007
CN 101017428 A 8/2007
(Continued)

OTHER PUBLICATIONS

Heng Ji, R. Grishman and Wen Wang, "Phonetic name matching for cross-lingual Spoken Sentence Retrieval," 2008 IEEE Spoken Language Technology Workshop, 2008, pp. 281-284 (Year: 2008).*
(Continued)

*Primary Examiner* — Edgar X Guerra-Erazo

(57) ABSTRACT

A speech recognition method comprises: generating, based on a preset speech knowledge source, a search space comprising preset client information and for decoding a speech signal; extracting a characteristic vector sequence of a to-be-recognized speech signal; calculating a probability at which the characteristic vector corresponds to each basic unit of the search space; and executing a decoding operation in the search space by using the probability as an input to obtain a word sequence corresponding to the characteristic vector sequence.

20 Claims, 8 Drawing Sheets

Related U.S. Application Data continuation of application No. PCT/CN2016/103691, filed on Oct. 28, 2016.

(51) Int. Cl.
*G10L 15/30* (2013.01)
*G10L 15/26* (2006.01)
*G10L 15/02* (2006.01)
*G10L 15/06* (2013.01)

(52) U.S. Cl.
CPC ........ *G10L 15/30* (2013.01); *G10L 2015/022* (2013.01); *G10L 2015/0633* (2013.01)

(58) Field of Classification Search
CPC ...... G06F 40/226; G06F 40/289; G06F 40/56; G06F 40/58
See application file for complete search history.

(56) References Cited

U.S. PATENT DOCUMENTS

| | | | |
|---|---|---|---|
| 6,839,667 | B2 | 1/2005 | Reich |
| 7,072,880 | B2 | 7/2006 | Beesley |
| 7,254,529 | B2 | 8/2007 | Gao et al. |
| 7,275,034 | B2 | 9/2007 | Odell et al. |
| 7,464,031 | B2 | 12/2008 | Axelrod et al. |
| 7,562,014 | B1 | 7/2009 | Hakkani-fur et al. |
| 7,693,713 | B2 | 4/2010 | He et al. |
| 7,720,683 | B1 | 5/2010 | Vermeulen et al. |
| 7,869,999 | B2 | 1/2011 | Amato et al. |
| 8,019,602 | B2 | 9/2011 | Yu et al. |
| 8,131,545 | B1 | 3/2012 | Moreno et al. |
| 8,195,462 | B2 | 6/2012 | Blewett et al. |
| 8,275,615 | B2 | 9/2012 | Kozat et al. |
| 8,290,774 | B1 | 10/2012 | Mohri |
| 8,311,825 | B2 | 11/2012 | Chen |
| 8,442,821 | B1 | 5/2013 | Vanhoucke |
| 8,706,475 | B2 * | 4/2014 | Dejean .................. G06F 40/258 715/713 |
| 8,805,684 | B1 | 8/2014 | Aleksic et al. |
| 8,914,288 | B2 | 12/2014 | Williams et al. |
| 8,972,243 | B1 | 3/2015 | Strom et al. |
| 9,229,916 | B2 * | 1/2016 | DeLuca ................ G06F 40/143 |
| 9,355,083 | B1 * | 5/2016 | Meran ..................... G06F 40/14 |
| 9,640,175 | B2 | 5/2017 | Liu et al. |
| 10,741,170 | B2 * | 8/2020 | Li ............................. G10L 15/02 |
| 2002/0138274 | A1 | 9/2002 | Sharma et al. |
| 2006/0190253 | A1 | 8/2006 | Hakkani-tur et al. |
| 2007/0192104 | A1 | 8/2007 | Blewett et al. |
| 2007/0239455 | A1 | 10/2007 | Groble et al. |
| 2008/0040099 | A1 | 2/2008 | Wu et al. |
| 2008/0154600 | A1 | 6/2008 | Tian et al. |
| 2009/0125307 | A1 | 5/2009 | Wang |
| 2010/0306260 | A1 * | 12/2010 | Dejean ................. G06V 30/416 707/811 |
| 2011/0288869 | A1 | 11/2011 | Menendez-pidal et al. |
| 2013/0311182 | A1 | 11/2013 | Kim et al. |
| 2014/0278413 | A1 | 9/2014 | Pitschel et al. |
| 2014/0358539 | A1 | 12/2014 | Rao et al. |
| 2015/0121204 | A1 * | 4/2015 | O'Donoghue ........ G06F 40/114 715/251 |
| 2015/0348542 | A1 | 12/2015 | Pan et al. |
| 2016/0232894 | A1 | 8/2016 | Park et al. |
| 2016/0260428 | A1 | 9/2016 | Matsuda et al. |

FOREIGN PATENT DOCUMENTS

| | | |
|---|---|---|
| CN | 101320561 A | 12/2008 |
| CN | 101464896 A | 6/2009 |
| CN | 101499277 A | 8/2009 |
| CN | 101510222 A | 8/2009 |
| CN | 102402983 A | 4/2012 |
| CN | 102629246 A | 8/2012 |
| CN | 102722525 A | 10/2012 |
| CN | 103065630 A | 4/2013 |
| CN | 103188408 A | 7/2013 |
| CN | 103281425 A | 9/2013 |
| CN | 103325370 A | 9/2013 |
| CN | 103794214 A | 5/2014 |
| CN | 103903619 A | 7/2014 |
| CN | 104008132 A | 8/2014 |
| CN | 104064182 A | 9/2014 |
| CN | 104538031 A | 4/2015 |
| CN | 105027197 A | 11/2015 |
| EP | 1696421 B1 | 8/2008 |
| JP | 2002-342323 A | 11/2002 |
| JP | 2005-283972 A | 10/2005 |
| JP | 2007-280364 A | 10/2007 |
| JP | 2011-248360 A | 12/2011 |
| JP | 2013-171214 A | 9/2013 |
| JP | 2015-041055 A | 3/2015 |
| JP | 2015-87555 A | 5/2015 |
| JP | 2015-87556 U | 5/2015 |
| JP | 2015-102806 A | 6/2015 |
| KR | 20150041599 A | 4/2015 |
| WO | 99/16052 A2 | 4/1999 |
| WO | 2014/201834 A1 | 12/2014 |

OTHER PUBLICATIONS

Supplementary Search for Chinese Application No. 201510752397.4 dated Nov. 10, 2020.
Supplementary Search for Chinese Application No. 201510752397.4 dated Mar. 17, 2021.
Supplementary Search for Chinese Application No. 201510752397.4 dated Jul. 24, 2021.
First Search dated Apr. 17, 2020, issued in related Chinese Patent Application No. 201510752397.4 (2 pages).
First Office Action dated Apr. 26, 2020, issued in related Chinese Patent Application No. 201510752397.4, with English machine translation (38 pages).
International Search Report and Written Opinion for Application No. PCT/CN2016/103691, dated Feb. 4, 2017, 11 pages.
Huang et al., "A Historical Perspective of Speech Recognition," Communication of the ACM, vol. 57, No. 1, Jan. 2014 (11 pages).
Xue et al., "Fast Adaptation of Deep Neural Network Based on Discriminant Codes for Speech Recognition," IEEE/ACM Transactions on Audio, Speech, and Language Processing, Dec. 2014, (28 pages).
Search Report for European Application No. 16861490.7 dated May 27, 2019 (8 pages).
Pffice Action for Japanese Application No. 2018-541475 dated May 7, 2019 (8 pages).
Aleksic et al., "Bringing Contextual Information to Google Speech Recognition," Interspeech 2015, Sep. 6, 2015, retrieved from internet on Feb. 14, 2017: https://static.googleusercontent.com/media/research.google.com/en//pubs/archive/43819.pdf (5 pages).
Cheng et al., "A Generalized Dynamic Composition Algorithm of Weighted Finite State Transducers for Large Vocabulary Speech Recognition," 2007 IEEE International Conference on Acoustics, Speech, and Signal Processing, Apr. 15, 2007 (4 pages).
Samuelsson et al., "A class-based language model for large-vocabulary speech recognition extracted from part-of-speech statistics," ICASSP, IEEE International Conference on Acoustics, Speech and Signal Processing—Proceedings, IEEE, Mar. 15, 1999 (4 pages).
International Preliminary Reporton Patentability Chapter I for Application No. PCT/CN2016/103691 dated May 17, 2018 (12 pages).
Examination Report dated Jun. 17, 2020, issued in related European Patent Application No. 16861490.7 (7 pages).

* cited by examiner

SPEECH RECOGNITION METHOD AND APPARATUS

CROSS REFERENCE TO RELATED APPLICATIONS

The present application is a divisional application of U.S. application Ser. No. 15/969,926, filed on May 3, 2018, which is a continuation application of PCT Application No. PCT/CN2016/103691, filed on Oct. 28, 2016. The PCT application claims priority to Chinese Patent Application No. 201510752397.4, filed on Nov. 6, 2015 and entitled "Speech Recognition Method and Apparatus." The entire contents of all of the above applications are incorporated herein by reference.

TECHNICAL FIELD

The present application relates to speech recognition technologies, and in particular, to speech recognition methods and apparatuses.

BACKGROUND

Speech is an acoustic expression of a language, the most natural, most effective, and most convenient means for humans to exchange information, and also a medium for carrying human thoughts. Automatic Speech Recognition (ASR) usually refers to a process in which a device like a computer converts what is spoken by humans into corresponding output texts or instructions through speech recognition and interpretation. The core framework is that, on the basis of modeling with a statistical model and according to a characteristic sequence O extracted from a to-be-recognized speech signal, an optimal word sequence W* corresponding to the to-be-recognized speech signal is calculated using the following Bayes decision rule:

$$W^* = \operatorname{argmax} P(O|W)P(W)$$

In some implementations, the above process of arriving at the optimal word sequence is referred to as a decoding process (a module for achieving decoding function is usually referred to as a decoder), namely, an optimal word sequence shown by the equation above is found through searching in a search space formed by a variety of knowledge sources, such as lexicons, language models, and the like.

Along with the development of various technologies, hardware computation capabilities and storage capacities have been greatly improved. Speech recognition systems have been gradually applied in the industry, and various applications that use speech as a human-machine interaction medium have also appeared on client devices, for example, a calling application on smartphones can automatically place a phone call when a user simply gives a speech instruction (e.g., "call Zhang San").

Existing speech recognition applications typically use two modes. One mode is based on client and server, i.e., a client collects speech, which is uploaded via a network to a server, and the server recognizes the speech to obtain texts via decoding and sends the texts back to the client. Such mode is adopted because the client has a relatively weak computation capability and limited memory space, while the server has significant advantages in these two aspects. If there is no network access when this mode is used, however, the client is unable to complete the speech recognition function. In light of this problem, a second mode of speech recognition application has been developed that only depends on the client. In such mode, the model and the search space that are originally stored on the server are downsized to store locally on the client device, and the client completes operations of speech collection and decoding on its own.

In an actual application, when the above general framework is used for speech recognition in either the first mode or the second mode, it is usually impossible to effectively recognize contents in a speech signal that are related to local information of a client device, e.g., a contact name in Contacts, thereby leading to a low recognition accuracy, causing inconvenience to the user, and affecting the user experience.

SUMMARY

Embodiments of the present disclosure provide speech recognition methods and apparatuses to solve the problem of existing speech recognition technologies having a low accuracy for recognizing relevant local information of a client.

The present disclosure provides a speech recognition method, comprising: generating, by utilizing a preset speech knowledge source, a search space comprising preset client information and for decoding a speech signal; extracting a characteristic vector sequence of a to-be-recognized speech signal, the characteristic vector sequence comprising a sequence of characteristic vectors; calculating a probability at which the characteristic vector corresponds to each basic unit of the search space; and executing a decoding operation in the search space by using the probability as an input to obtain a word sequence corresponding to the characteristic vector sequence.

Optionally, the search space comprises: a weighted finite state transducer (WFST).

Optionally, the basic unit of the search space comprises: a context-dependent triphone; the preset speech knowledge source comprises: a lexicon, a language model, and a triphone state bundling list.

Optionally, the generating, by utilizing a preset speech knowledge source, a search space comprising preset client information and for decoding a speech signal comprises: adding, by label replacement, preset client information corresponding to a preset theme class into a pre-generated WFST that is at least based on the language model, to obtain a single WFST that is based on the triphone state bundling list, the lexicon, and the language model. The language model is obtained through pre-training in the following manner: replacing a preset name entity in texts for training a language model with a label corresponding to a preset theme class to obtain modified texts, and using the modified texts to train the language model.

Optionally, the adding, by label replacement, preset client information corresponding to a preset theme class into a pre-generated WFST that is at least based on the language model, to obtain a single WFST that is based on the triphone state bundling list, the lexicon, and the language model comprises: adding, by label replacement, the preset client information corresponding to the preset theme class into a pre-generated WFST that is based on the language model to obtain a WFST added with the preset client information; combining the WFST added with the preset client information with a pre-generated WFST that is based on the triphone state bundling list and the lexicon to obtain the single WFST.

Optionally, the texts for training a language model refers to texts for the preset theme class.

Optionally, the number of the preset theme classes is at least 2; the number of the language models and the number of the WFSTs that are at least based on the language models are the same as the number of the preset theme classes, respectively; the adding, by label replacement, preset client information corresponding to a preset theme class into a pre-generated WFST that is at least based on the language model comprises: determining a preset theme class to which the to-be-recognized speech signal belongs; selecting the pre-generated WFST that corresponds to the preset theme class to which the to-be-recognized speech signal belongs and that is at least based on the language model; adding, by replacing a corresponding label with preset client information corresponding to the preset theme class, the preset client information into the selected WFST.

Optionally, the determining a preset theme class to which the to-be-recognized speech signal belongs is achieved in the following manner: determining, according to the type of the client or an application program that collects the speech signal, the preset theme class to which the to-be-recognized speech signal belongs.

Optionally, the preset theme class comprises: making a phone call, sending a text message, playing a song, or setting an instruction; the corresponding preset client information comprises: names of contacts in Contacts, names of songs in a song library, or instructions in an instruction set.

Optionally, the combining operation comprises: combining by using a prediction-based method.

Optionally, the wordlist used to pre-train the language model is consistent with the words comprised in the lexicon.

Optionally, the calculating a probability at which the characteristic vector corresponds to each basic unit of the search space comprises: using a pre-trained DNN (Deep Neural Network) model to calculate a probability at which the characteristic vector corresponds to each triphone state; using a pre-trained HMM (Hidden Markov Model) model to calculate a probability at which the characteristic vector corresponds to each triphone according to the probability at which the characteristic vector corresponds to each triphone state.

Optionally, the execution speed is improved in the following manner for the step of using a pre-trained DNN model to calculate a probability at which the characteristic vector corresponds to each triphone state: using data parallel processing capability provided by a hardware platform.

Optionally, the extracting a characteristic vector sequence of a to-be-recognized speech signal comprises: performing frame-dividing processing on the to-be-recognized speech signal according to a preset frame length to obtain a plurality of audio frames; extracting a characteristic vector of each audio frame to obtain the characteristic vector sequence.

Optionally, the extracting a characteristic vector of each audio frame comprises: extracting an MFCC (Mel Frequency Cepstrum Coefficient) characteristic, a PLP (Perceptual Linear Predictive) characteristic, or an LPC (Linear Predictive Coding) characteristic.

Optionally, after the obtaining a word sequence corresponding to the characteristic vector sequence, the following operation is executed: verifying the accuracy of the word sequence by performing text matching with the preset client information, and generating a corresponding speech recognition result according to a result of the verification.

Optionally, the verifying the accuracy of the word sequence by performing text matching with the preset client information, and obtaining a corresponding speech recognition result according to a result of the verification comprises: selecting a to-be-verified word that corresponds to the preset client information from the word sequence; searching for the to-be-verified word in the preset client information; if the to-be-verified word is found, determining that the accuracy verification passes, and using the word sequence as the speech recognition result; otherwise, correcting the word sequence by pinyin-based fuzzy matching, and using the corrected word sequence as the speech recognition result.

Optionally, the correcting the word sequence by pinyin-based fuzzy matching comprises: converting the to-be-verified word to a to-be-verified pinyin sequence; converting each word in the preset client information into a comparison pinyin sequence, respectively; sequentially calculating a degree of similarity between the to-be-verified pinyin sequence and each comparison pinyin sequence, and selecting a word from the preset client information that is ranked high after being sorted in a descending order of the degree of similarity; using the selected word to replace the to-be-verified word in the word sequence to obtain the corrected word sequence.

Optionally, the degree of similarity comprises: a degree of similarity calculated according to an edit distance.

Optionally, the method is implemented on a client device; the client device comprises: a smart mobile terminal, a smart speaker, or a robot.

Correspondingly, the present application further provides a speech recognition apparatus, comprising: a search space generating unit configured to generate, by utilizing a preset speech knowledge source, a search space comprising preset client information and for decoding a speech signal; a characteristic vector extracting unit configured to extract a characteristic vector sequence of a to-be-recognized speech signal; a probability calculating unit configured to calculate a probability at which the characteristic vector corresponds to each basic unit of the search space; and a decoding search unit configured to execute a decoding operation in the search space by using the probability as an input to obtain a word sequence corresponding to the characteristic vector sequence.

Optionally, the search space generating unit is configured to add, by label replacement, preset client information corresponding to a preset theme class into a pre-generated WFST that is at least based on the language model, to obtain a single WFST that is based on a triphone state bundling list, a lexicon, and the language model; the language model is pre-generated by a language model training unit, and the language model training unit is configured to replace a preset name entity in the texts for training a language model with a label corresponding to a preset theme class, and use the texts to train the language model.

Optionally, the search space generating unit comprises: a first client information adding sub-unit configured to add, by label replacement, the preset client information corresponding to the preset theme class into a pre-generated WFST that is based on the language model to obtain a WFST added with the preset client information; a WFST combining sub-unit configured to combine the WFST added with the preset client information with a pre-generated WFST that is based on the triphone state bundling list and the lexicon to obtain the single WFST.

Optionally, the search space generating unit comprises: a second client information adding sub-unit configured to add, by label replacement, preset client information corresponding to a preset theme class into a pre-generated WFST that is at least based on the language model; a unified WFST acquiring sub-unit configured to obtain, after the second client information adding sub-unit completes the addition operation, a single WFST that is based on the triphone state bundling list, the lexicon, and the language model. The second client information adding sub-unit comprises: a theme determining sub-unit configured to determine a preset theme class to which the to-be-recognized speech signal belongs; a WFST selecting sub-unit configured to select the pre-generated WFST that corresponds to the preset theme class to which the to-be-recognized speech signal belongs and that is at least based on the language model; a label replacing sub-unit configured to add, by replacing a corresponding label with preset client information corresponding to the preset theme class, the preset client information into the selected WFST.

Optionally, the theme determining sub-unit is configured to determine, according to the type of the client or an application program that collects the speech signal, the preset theme class to which the to-be-recognized speech signal belongs.

Optionally, the WFST combining sub-unit is configured to execute the combining operation by using a prediction-based method, and to obtain the single WFST.

Optionally, the probability calculating unit comprises: a triphone state probability calculating sub-unit configured to use a pre-trained DNN model to calculate a probability at which the characteristic vector corresponds to each triphone state; a triphone probability calculating sub-unit configured to use a pre-trained HMM model to calculate a probability at which the characteristic vector corresponds to each triphone according to the probability at which the characteristic vector corresponds to each triphone state.

Optionally, the characteristic vector extracting unit comprises: a frame dividing sub-unit configured to perform frame-dividing processing on the to-be-recognized speech signal according to a preset frame length to obtain a plurality of audio frames; a characteristic extracting sub-unit configured to extract a characteristic vector of each audio frame to obtain the characteristic vector sequence.

Optionally, the apparatus comprises: an accuracy verifying unit configured to verify, after the decoding search unit obtains a word sequence corresponding to the characteristic vector sequence, the accuracy of the word sequence by performing text matching with the preset client information, and to generate a corresponding speech recognition result according to a result of the verification.

Optionally, the accuracy verifying unit comprises: a to-be-verified word selecting sub-unit configured to select a to-be-verified word that corresponds to the preset client information from the word sequence; a searching sub-unit configured to search for the to-be-verified word in the preset client information; a recognition result determining sub-unit configured to determine, when the searching sub-unit finds the to-be-verified word, that the accuracy verification passes, and use the word sequence as the speech recognition result; a recognition result correcting sub-unit configured to correct, when the searching sub-unit does not find the to-be-verified word, the word sequence by pinyin-based fuzzy matching, and to use the corrected word sequence as the speech recognition result.

Optionally, the recognition result correcting sub-unit comprises: a to-be-verified pinyin sequence converting sub-unit configured to convert the to-be-verified word to a to-be-verified pinyin sequence; a comparison pinyin sequence converting sub-unit configured to convert each word in the preset client information into a comparison pinyin sequence, respectively; a degree of similarity calculating sub-unit configured to sequentially calculate a degree of similarity between the to-be-verified pinyin sequence and each comparison pinyin sequence, and select a word from the preset client information that is ranked high after being sorted in a descending order of the degree of similarity; a to-be-verified word replacing sub-unit configured to use the selected word to replace the to-be-verified word in the word sequence to obtain the corrected word sequence.

Furthermore, the present application provides another speech recognition method, comprising: acquiring, through decoding, a word sequence corresponding to a to-be-recognized speech signal; verifying the accuracy of the word sequence by performing text matching with the preset client information, and generating a corresponding speech recognition result according to a result of the verification.

Optionally, the verifying the accuracy of the word sequence by performing text matching with the preset client information, and generating a corresponding speech recognition result according to a result of the verification comprises: selecting a to-be-verified word that corresponds to the preset client information from the word sequence; searching for the to-be-verified word in the preset client information; if the to-be-verified word is found, determining that the accuracy verification passes, and using the word sequence as the speech recognition result; otherwise, correcting the word sequence by pinyin-based fuzzy matching, and using the corrected word sequence as the speech recognition result.

Optionally, the correcting the word sequence by pinyin-based fuzzy matching comprises: converting the to-be-verified word to a to-be-verified pinyin sequence; converting each word in the preset client information into a comparison pinyin sequence, respectively; sequentially calculating a degree of similarity between the to-be-verified pinyin sequence and each comparison pinyin sequence, and selecting a word from the preset client information that is ranked high after being sorted in a descending order of the degree of similarity; using the selected word to replace the to-be-verified word in the word sequence to obtain the corrected word sequence.

Correspondingly, the present application further provides another speech recognition apparatus, comprising: a word sequence acquiring unit configured to acquire, through decoding, a word sequence corresponding to a to-be-recognized speech signal; a word sequence verifying unit configured to verify the accuracy of the word sequence by performing text matching with the preset client information, and to generate a corresponding speech recognition result according to a result of the verification.

Optionally, the word sequence verifying unit comprises: a to-be-verified word selecting sub-unit configured to select a to-be-verified word that corresponds to the preset client information from the word sequence; a searching sub-unit configured to search for the to-be-verified word in the preset client information; a recognition result determining sub-unit configured to determine, when the searching sub-unit finds the to-be-verified word, that the accuracy verification passes, and use the word sequence as the speech recognition result; a recognition result correcting sub-unit configured to correct, when the searching sub-unit does not find the to-be-verified word, the word sequence by pinyin-based fuzzy matching, and to use the corrected word sequence as the speech recognition result.

Optionally, the recognition result correcting sub-unit comprises: a to-be-verified pinyin sequence converting sub-unit configured to convert the to-be-verified word to a to-be-verified pinyin sequence; a comparison pinyin sequence converting sub-unit configured to convert each word in the preset client information into a comparison pinyin sequence, respectively; a degree of similarity calculating sub-unit configured to sequentially calculate a degree of similarity between the to-be-verified pinyin sequence and each comparison pinyin sequence, and select a word from the preset client information that is ranked high after being sorted in a descending order of the degree of similarity; a to-be-verified word replacing sub-unit configured to use the selected word to replace the to-be-verified word in the word sequence to obtain the corrected word sequence.

The present disclosure provides a speech recognition apparatus comprising a processor and a non-transitory computer-readable storage medium storing instructions that, when executed by the processor, cause the device to perform a method. The method comprises: generating, by utilizing a preset speech knowledge source, a search space comprising preset client information and for decoding a speech signal; extracting a characteristic vector sequence of a to-be-recognized speech signal, the characteristic vector sequence comprising a sequence of characteristic vectors; calculating a probability at which the characteristic vector corresponds to each basic unit of the search space; and executing a decoding operation in the search space by using the probability as an input to obtain a word sequence corresponding to the characteristic vector sequence.

Based on a preset speech knowledge source, a search space comprising preset client information and for decoding a speech signal is generated, a probability at which a characteristic vector extracted from a to-be-recognized speech signal corresponds to a basic unit of the search space is calculated, and a decoding operation is executed in the search space according to the probability, thereby obtaining a word sequence corresponding to the to-be-recognized speech signal. Since the preset client information is comprised in the search space when the search space for decoding is generated, the disclosed methods and apparatuses can recognize information related to the client in a relatively accurate manner when recognizing a speech signal collected by the client. As such, the accuracy of speech recognition and the user experience can be improved.

DETAILED DESCRIPTION

Figure 1:
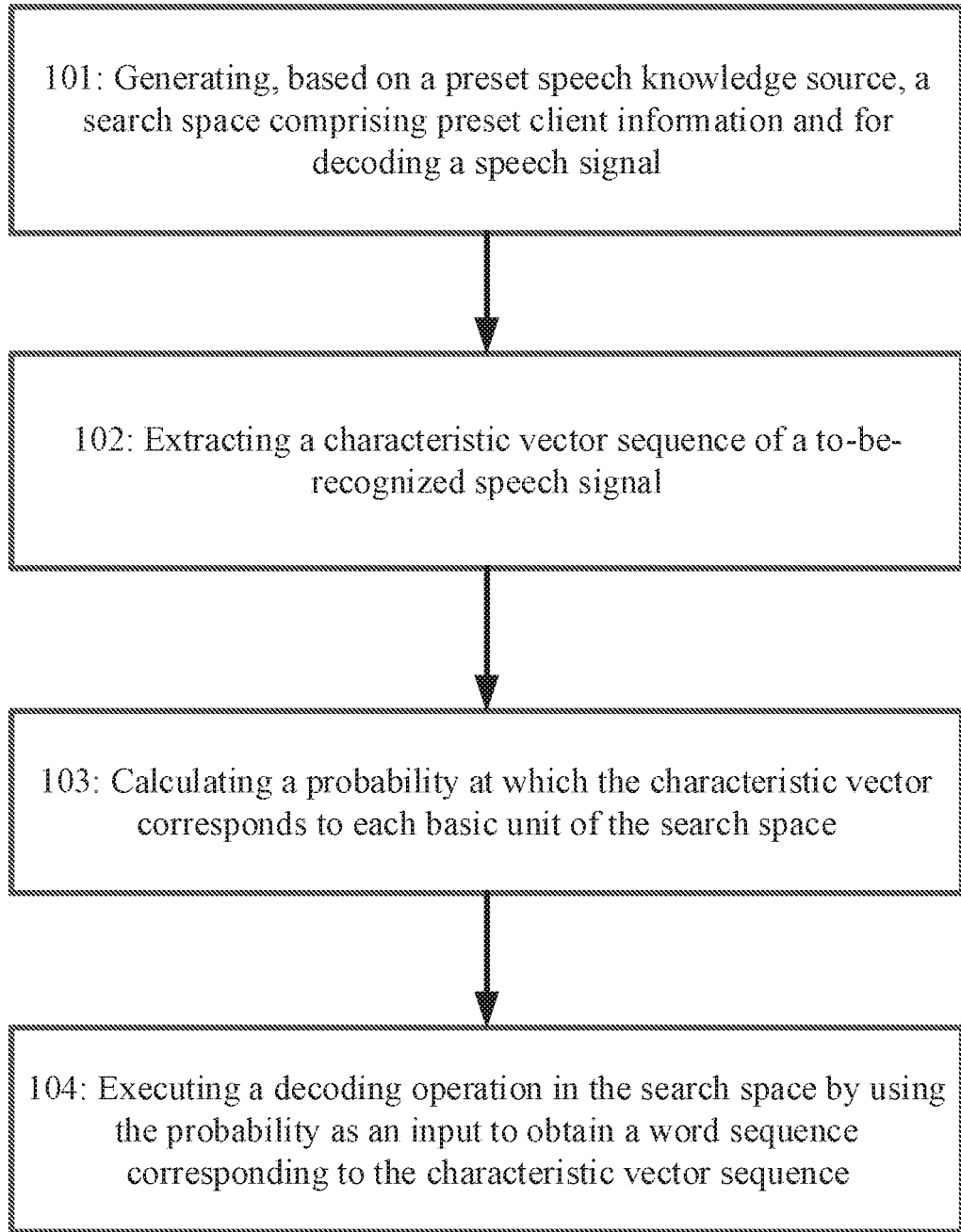
FIG. 1 is a flow chart of an exemplary speech recognition method according to the present disclosure.

Details are explained in the description below to facilitate a thorough understanding of the present disclosure. However, the disclosed methods, systems, and apparatuses can be implemented in many other manners different from those described herein. A person skilled in the art can arrive at similar embodiments without contradicting the contents of the present disclosure. Therefore, the present disclosure is not limited by specific embodiments disclosed below.

In the present disclosure, various speech recognition methods and corresponding apparatuses, are provided. To facilitate the understanding, the technical solutions and related technical terms of the present disclosure, as well as manners in which the embodiments of the present disclosure are written, will be briefly described before the description of the embodiments.

The speech recognition method according to the present disclosure can be applied in applications that use speech as a human-machine interaction medium. This type of applications can recognize a collected speech signal to obtain texts, and then execute corresponding operations according to the texts. The speech signal typically relates to preset information that is local to a client (e.g., name of a contact in Contacts). Existing speech recognition technologies perform decoding recognition on the above to-be-recognized speech signal by using a general search space, while the general search space does not consider the differences of this type of applications on different clients. Therefore, it is usually impossible to effectively recognize contents in a speech signal that are related to local information of a client, leading to a low recognition accuracy. With regard to this problem, the technical solutions of the present disclosure can integrate preset client information in the process of constructing a search space for decoding a speech signal, which can be customizing a particular speech recognition demand of the client. As a result, local information related to a client can be effectively recognized to improve speech recognition accuracy.

In a speech recognition system, the process of obtaining the best matching word sequence according to a to-be-recognized speech signal is referred to as decoding. The search space for decoding a speech signal according to the present disclosure refers to a space covered by speech knowledge sources involved in the speech recognition system (e.g., acoustic models, lexicons, language models, and the like) and formed by all possible speech recognition results. Correspondingly, the decoding process is a process of performing search and matching in the search space to obtain the optimal match for the to-be-recognized speech signal.

The search space can be in various forms. Search spaces with various knowledge sources at different levels that are mutually independent can be used. The decoding process can be a process of level by level calculation and search. Alternatively, a search space based on WFST (Weighted Finite State Transducer) may be used to integrate various knowledge sources into a unified WFST network (also referred to as a WFST search space). The latter mode can facilitate the introduction of different knowledge sources and can improve the search efficiency.

The core of the WFST search space is using WFST to simulate the grammatical structure of a language and related acoustic characteristics. The operating method thereof comprises expressing knowledge sources at different levels in the WFST form, respectively, and then using WFST characteristics and a combining algorithm to integrate the above knowledge sources at the different levels into a single WFST network and to form the search space for speech recognition.

The basic unit of a WFST network (i.e., a basic input unit that drives WFST to perform state transduction) can be selected according to particular needs. Considering the impact of a phoneme's context on the pronunciation of the phoneme, context-dependent triphone (triphone or triphoneme in short) can be used as the basic unit of a WFST network in the embodiments of the present disclosure so as to achieve higher recognition accuracy rate. Corresponding knowledge sources for constructing the WFST search space include a triphone state bundling list, a lexicon, and a language model.

The triphone state bundling list typically comprises bundling relations between triphones that are based on pronunciation characteristics. When an acoustic model is trained with the triphone as a modeling unit, there is a great amount of possible ways of combination of triphones. To reduce the demand for training data, different triphones can be clustered based on pronunciation characteristics by using a decision tree clustering method and following the maximum likelihood rule, and a bundling technology is used to bundle triphones with the same pronunciation characteristics to facilitate parameter sharing, thereby obtaining the triphone state bundling list. The lexicon typically comprises corresponding relations between phonemes and words, which is a bridge between an acoustic layer (physical layer) and a semantic layer to couple and associate the content of the acoustic layer and the content of the semantic layer. The language model provides knowledge related to language structures, and is used to calculate the probability at which a word sequence appears in a natural language. An n-gram grammatical language model is typically used in practical implementations, and the model can be created by statistically determining the possibility of subsequent appearance of the words.

When a WFST network constructed based on the above knowledge sources is used for speech recognition, to drive the WFST to perform desired search, a characteristic vector sequence of a to-be-recognized speech signal can be extracted first. A pre-trained model is then used to calculate a probability at which the characteristic vector corresponds to each triphone. A decoding operation is executed in the WFST search space according to the probability of each triphone to obtain a word sequence corresponding to the to-be-recognized speech signal.

In some embodiments, context-dependent triphone is used as the basic unit of a WFST network in the embodiments of the present disclosure. In other implementation manners, other speech units can also be used as the basic unit of the WFST network, for example monophone or triphone state. When different basic units are used, there will be certain difference when a search space is constructed and when probability is calculated according to characteristic vectors. For example, if triphone state is used as the basic unit, then an HMM-based (Hidden Markov Model-based) acoustic model can be integrated when a WFST network is constructed, and a probability at which the characteristic vector corresponds to each triphone state can be calculated during speech recognition. All of the above are variations of implementation manners. They can achieve the technical solutions of the present disclosure as long as the preset client information is comprised in the search space during the search space construction.

Referring to FIG. 1, FIG. 1 is a flow chart of an exemplary speech recognition method according to the present disclosure. According to one embodiment, the method comprises step 101 to step 104. To improve the execution efficiency during implementation, relevant preparation can be completed prior to step 101 (the phase which can also be referred to as a preparation phase), so as to generate class-based language model(s), WFST with a preset structure, and speech recognition acoustic model(s), in preparation for the execution of step 101. The preparation phase will be first described in detail below.

In the preparation phase, a language model can be trained in the following manner: replacing a preset name entity in the texts for training a language model with a label corresponding to a preset theme class, and using the texts to train the language model. The name entity may comprise an entity in the text that has a particular class, e.g., name of a person, name of a song, name of an organization, name of a place, and the like.

An application for placing phone calls is used as an example below: the preset theme class is making a phone call, the corresponding label is "$CONTACT," and the preset name entity is a name of a person. When a language model is pre-trained, the name in the training texts can be replaced by the corresponding label. For example, "Xiao Ming" (a common name in Chinese) in "I want to call Xiao Ming" is replaced by "$CONTACT," and the obtained training texts is "I want to call $CONTACT." A class-based language model is obtained by using the texts after the above entity replacement to train the language model. On the basis that the above language model is obtained through training, a language model-based WFST can be further pre-generated, which is hereinafter referred to as G-structure WFST.

In some embodiments, to reduce the size of the language model and the size of the corresponding G-structure WFST, texts for the preset theme class (which may also be referred to as class-based training text) can be selected for training. For example, the preset theme class is making a phone call, and then the texts for the preset theme class can comprise: "I want to call Xiao Ming," "give Xiao Ming a call," and the like.

In light of the diversity of client devices and application programs that use speech as a human-machine interaction medium, two or more theme classes can be preset, and a class-based language model can be pre-trained for each theme class, respectively, and a G-structure WFST can be constructed based on the language model.

In the preparation phase, lexicon-based WFST can also be pre-constructed, which is hereinafter referred to as L-structure WFST, and triphone-state-bundling-list-based WFST can also be pre-constructed, which is hereinafter referred to as C-structure WFST. Then, a pertinent and selective combining operation can be performed on the above WFSTs in a preset manner. For example, the C-structure and L-structure WFSTs can be combined into a CL-structure WFST, the L-structure and G-structure WFSTs can be combined into a LG-structure WFST, and the C-structure, L-structure, and G-structure WFSTs can be combined into a CLG-structure WFST. In some embodiments, a CL-structure WFST and a G-structure WFST are generated in the preparation phase (referring to relevant texts in step 101 for description of the combining operation).

In the preparation phase, moreover, an acoustic model for speech recognition can be pre-trained. In some embodiments, each triphone is characterized by an HMM (Hidden Markov Model) with the hidden state of HMM being one state of the triphone (each triphone typically comprises three states), and a GMM (Gaussian mixture model) model is used to determine transmission probability at which each hidden state of HMM outputs each characteristic vector. Characteristic vectors extracted from massive speech data are used as training samples, and the Baum-Welch algorithm is used to learn parameters of the GMM model and the HMM model to obtain a GMM model corresponding to each state and an HMM model corresponding to each triphone. In the subsequent step 103, the pre-trained GMM and HMM models can be used to calculate a probability at which the characteristic vector corresponds to each triphone.

To improve the accuracy of speech recognition, in some embodiments, a DNN (Deep Neural Networks) model is used to replace the GMM model when performing speech recognition. Correspondingly, the DNN model that outputs a probability corresponding to each triphone state according to an input characteristic vector can be pre-trained in the preparation phase. In some implementation, the DNN model can be obtained by performing forced alignment on a training sample, adding a label corresponding to each triphone state into the training sample, and training the GMM and HMM models with the labeled training sample.

In some embodiments, the amount of computation in the preparation phase of some implementation is very high, which imposes relatively high requirements for memory and computation speed. Therefore, operations of the preparation phase can be completed at a server. To be able to carry out a function of speech recognition even when the environment has no network access, the method according to the present disclosure can be implemented on a client device. Therefore, all WFSTs generated in the preparation phase and all models for calculation of acoustic probabilities can be pre-installed into the client device, for example, packaged with application programs and installed together to the client.

Steps 101 to 104 will be described in detail below.

Step 101. Generating, based on a preset speech knowledge source, a search space comprising preset client information and for decoding a speech signal.

A WFST search space is constructed in this step to prepare for subsequent speech recognition. In some implementation, this step is executed in an activation phase (also referred to as an initialization phase) of a client application program that uses speech as a human-machine interaction medium, to add, by label replacement, preset client information corresponding to a preset theme class into a pre-generated WFST that is at least based on a language model and to obtain a single WFST that is based on a triphone state bundling list, a lexicon, and a language model.

Figure 2:
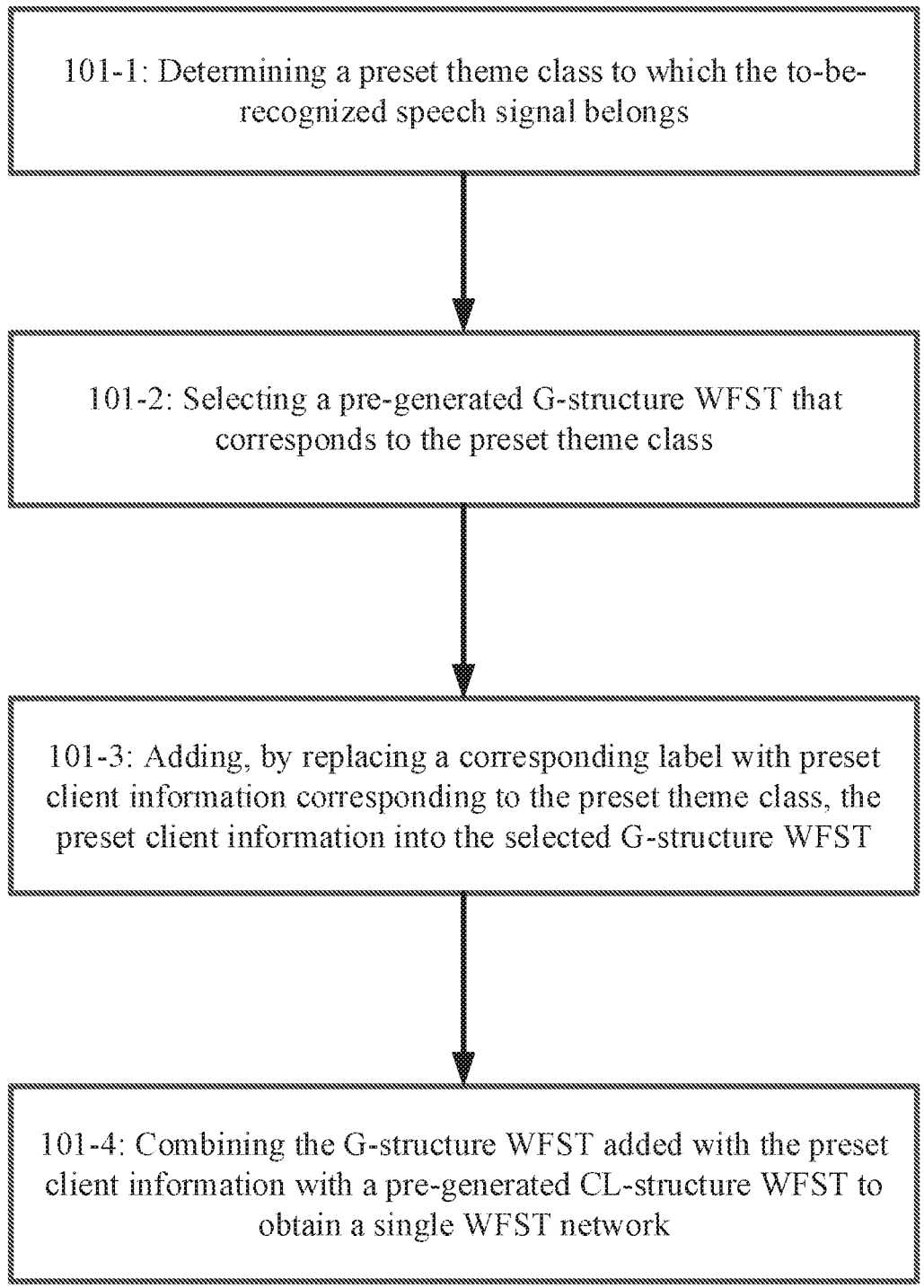
FIG. 2 is a flow chart of an exemplary process for generating a search space comprising preset client information and for decoding a speech signal according to some embodiments of the present disclosure.

The processes in this step can comprise the following steps 101-1 to 101-4, which will be further described below with reference to FIG. 2.

Step 101-1. Determining a preset theme class to which the to-be-recognized speech signal belongs.

In some implementation, the preset theme class to which the to-be-recognized speech signal belongs can be determined according to the type of the client or an application program that collects the speech signal. The preset theme class comprises: making a phone call, sending a text message, playing a song, setting an instruction, or theme classes related to other application scenarios. Here, the preset client information corresponding to making a phone call or sending a text message comprises names of contacts in Contacts, the preset client information corresponding to playing a song comprises names of songs in a song library, the preset client information corresponding to setting an instruction comprises instructions in an instruction set, and theme classes related to other application scenarios can similarly correspond to preset client information involved in the application scenarios, which will not be repeated herein.

For example, for a smartphone, it can be determined according to the type of the client that the preset theme class to which a to-be-recognized speech signal belongs is making a phone call or sending a text message, and the corresponding preset client information comprises names of contacts in Contacts. For a smart speaker, it can be determined that the preset theme class is playing a song, and the corresponding preset client information comprises names of songs in a song library. For a robot, it can be determined that the preset theme class is setting an instruction, and the corresponding preset client information comprises instructions in an instruction set.

Considering that a client device can simultaneously have a plurality of applications that use speech as a human-machine interaction medium, different applications involve different preset client information. For example, a smartphone can also be installed with a speech-interaction-based music player. In such a case, the preset theme class to which a to-be-recognized speech signal belongs can be determined according to the application program that is currently activated.

Step 101-2. Selecting a pre-generated G-structure WFST that corresponds to the preset theme class.

In a circumstance of having a plurality of preset theme classes, a plurality of G-structure WFSTs would be generated in the preparation phase, and each G-structure WFST corresponds to a different preset theme class. This step selects, from the pre-generated plurality of G-structure WFSTs, a G-structure WFST that corresponds to the preset theme class determined in the step 101-1.

Step 101-3. Adding, by replacing a corresponding label with preset client information corresponding to the preset theme class, the preset client information into the selected G-structure WFST.

When a class-based language model is trained for each preset theme class in the preparation phase, a preset name entity in the training texts is replaced with a label corresponding to the corresponding preset theme class. For example, if the preset theme class is making a phone call or sending a text message, the name of a person in the training texts is replaced with a label of "$CONTACT"; if the preset theme class is playing a song, the name of a song in the training texts is replaced with a label of "$SONG". Therefore, a generated G-structure WFST comprises label information corresponding to a preset theme class. This step uses preset client information that corresponds to the preset theme class determined in the step 101-1 to replace the corresponding label in the G-structure WFST selected in the step 101-2, thereby achieving the goal of adding the preset client information into the selected G-structure WFST.

Figure 3:
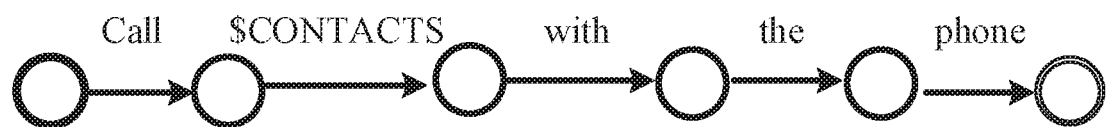
FIG. 3 is a schematic diagram of G-structure WFST before execution of a replacement operation according to some embodiments of the present disclosure.
Figure 4:
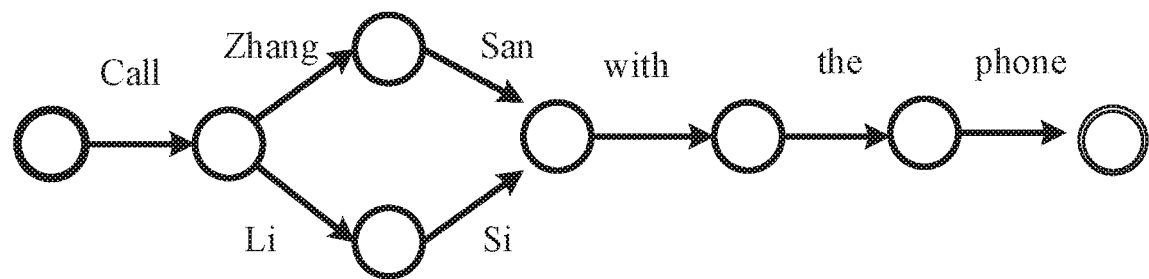
FIG. 4 is a schematic diagram of G-structure WFST after execution of a replacement operation according to some embodiments of the present disclosure.

For example, if the preset theme class is making a phone call or sending a text message, the label of "$CONTACT" in the G-structure WFST can be replaced with a name of a person in the local Contacts of the client, e.g., "Zhang San," "Li Si," (common names in Chinese) and the like; if the preset theme class is playing a song, the label of "$SONG" in the G-structure WFST can be replaced with a name of a song in the local song library of the client, e.g., "March of the Volunteers," and the like. To implement the replacement, by a state transition path corresponding to the label can be replaced with a number of parallel state transition paths. Referring to an example in which the replacement is performed with contacts in the client Contacts according to FIG. 3 and FIG. 4. Here, FIG. 3 is a schematic diagram of a G-structure WFST before replacement, and FIG. 4 is a schematic diagram of the G-structure WFST obtained after replacement is performed with "Zhang San" and "Li Si" in the Contacts.

Step 101-4. Combining the G-structure WFST added with the preset client information with a pre-generated CL-structure WFST to obtain a single WFST network.

In some embodiments, the knowledge sources used in speech recognition involve contents from a language layer (language model) to a physical layer (triphone state bundling list), and the task of this step is to combine (also referred to as incorporate or merge) WFSTs at different levels to obtain a single WFST network.

For two WFSTs, the basic condition for combining is that an output symbol of one WFST thereof is a subset of the input symbol set of another WFST. Provided that the above condition is satisfied, if two WFSTs, e.g., A and B, are integrated into a new WFST, C, then each state of C is formed by a state of A and a state of B, and each successful path of C is formed by a successful path of A, Pa, and a successful path of B, Pb. The input is i[P]=i[Pa], the output is o[P]=o[Pb], and the weighted value thereof is obtained through corresponding computation on the weighted values of Pa and Pb. The ultimately obtained C has WFST characteristics and search space that are common to both A and B. In some implementation, a combination algorithm provided by an OpenFst library can be used to execute the combining operation on two WFSTs.

In some embodiments, the L-structure WFST can be regarded as corresponding relations between monophones and words, while the C-structure WFST establishes corresponding relations between triphones and monophones, and its output corresponds to the input of the L-structure WFST. The C-structure and L-structure WFST can be combined. The CL-structure WFST has been obtained through combining in the preparation phase, and this step combines the CL-structure WFST with the G-structure WFST added with the preset client information in Step 101-3 to obtain a WFST network with the input being triphone probability and the output being a word sequence, thereby integrating WFSTs at different levels and corresponding to different knowledge sources into a single WFST network to form a search space for speech recognition.

In some embodiments, to accelerate the combining of the CL-structure WFST and the G-structure WFST and reduce the time for initialization, the conventional WFST combining method is not used when executing the combining operation, but a prediction-based combining method (a Lookahead combining method) is used. According to the Lookahead combining method, whether the combining operation being currently executed could lead to a non-accessible state is determined by predicting future paths. If yes, the current operation is blocked, and the subsequent combining operation is no longer executed. Unnecessary combining operation can be terminated early through prediction, which not only can save the combining time, but also can reduce the size of ultimately generated WFST and reduce the occupancy of storage space. In some implementation, a filter with the Lookahead function provided by an OpenFst library can be used to achieve the above prediction and screening function.

In some embodiments, to accelerate the combining of the CL-structure WFST and the G-structure WFST, the wordlist used to pre-train the language model is consistent with the words comprised in the lexicon. The number of words in the wordlist is usually greater than the number of words in the lexicon, while the number of words in the wordlist is directly related to the size of the G-structure WFST. If the G-structure WFST is relatively large, it will be relatively time-consuming when the G-structure WFST is combined with the CL-structure WFST. Therefore, the size of the wordlist can be reduced when training the language model in the preparation phase, such that the words in the wordlist are consistent with the words in the lexicon, thereby achieving an effect of shortening the time for combining the CL-structure WFST and the G-structure WFST.

At this point, the initialization process of the technical solution has been completed through the steps 101-1 to 101-4 and a WFST search space comprising the preset client information is generated.

In some embodiments, the CL-structure WFST can be combined and the G-structure WFST can be generated in advance in the preparation phase, the preset client information is added into the G-structure WFST in the step 101, and the CL structure is combined with the G structure to obtain a single WFST. In other implementation manners, other combining strategies can also be used. For example, the combination of the LG-structure WFST is completed in advance in the preparation phase, the preset client information is added into this WFST in the step 101, and then this WFST is combined with the C-structure WFST generated in the preparation phase. Alternatively, it is feasible that the combination of the CLG-structure WFST is directly completed in the preparation phase, and the preset client information is added into this WFST in the step 101. Considering that a WFST generated in the preparation phase needs to take up a storage space of a client, a relatively large storage space will be taken up in an application scenario with a plurality of class-based language models (correspondingly there is a plurality of G structure WFSTs) if each G-structure WFST is combined with other WFSTs in the preparation phase. Therefore, the combining manner adopted by the present embodiment is a preferred implementation manner, which can reduce the occupancy of the storage space of the client by the WFST generated in the preparation phase.

Step 102. Extracting a characteristic vector sequence of a to-be-recognized speech signal.

Figure 5:
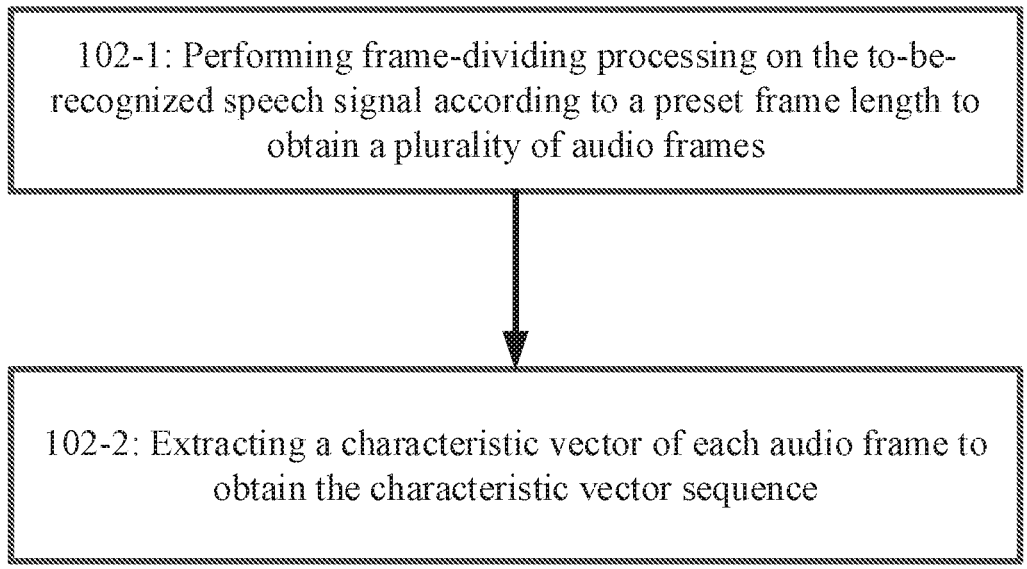
FIG. 5 is a flow chart of a process for extracting a characteristic vector sequence of a to-be-recognized speech signal according to some embodiments of the present disclosure.

A to-be-recognized speech signal can be a time domain signal. This step acquires a characteristic vector sequence that can characterize the speech signal through two processes, frame dividing and characteristic vector extracting. Further description will be provided below with reference to FIG. 5.

Step 102-1. Performing frame-dividing processing on the to-be-recognized speech signal according to a preset frame length to obtain a plurality of audio frames.

In some implementation, a frame length can be preset according to the need, for example, it can be set to 10 ms or 15 ms, and then the to-be-recognized speech signal is divided frame by frame according to the frame length, thereby dividing the speech signal into a plurality of audio frames. Depending on various dividing strategies that are adopted, adjacent audio frames may or may not overlap.

Step 102-2. Extracting a characteristic vector of each audio frame to obtain the characteristic vector sequence.

When the to-be-recognized speech signal is divided into a plurality of audio frames, a characteristic vector that characterizes the speech signal can be extracted frame by frame. Since a speech signal has relatively weak description ability on a time domain, Fourier Transformation can be performed on each audio frame, and then a frequency domain characteristic is extracted as a characteristic vector of an audio frame. For example, an MFCC (Mel Frequency Cepstrum Coefficient) characteristic, a PLP (Perceptual Linear Predictive) characteristic, or an LPC (Linear Predictive Coding) characteristic can be extracted.

Extraction of an MFCC characteristic of an audio frame will be used as an example below to further describe the process of extracting a characteristic vector. First, a time domain signal of the audio frame is subjected to FFT (Fast Fourier Transformation) to obtain corresponding spectral information, the spectral information is made to pass through a Mel filter set to obtain a Mel spectrum, and cepstrum analysis is performed on the Mel spectrum. The core steps may comprise using DCT (Discrete Cosine Transform) for inverse transformation. Then, N preset coefficients (e.g., N=12 or 38) are taken to obtain a characteristic vector of the audio frame: an MFCC characteristic. Each audio frame is processed in the above manner, and a series of characteristic vectors that characterize the speech signal can be obtained, which is the characteristic vector sequence according to the present disclosure.

Step 103. Calculating a probability at which the characteristic vector corresponds to each basic unit of the search space.

In some embodiments, the basic unit of the WFST search space is triphone. Therefore, a probability at which the characteristic vector corresponds to each triphone is calculated in this step. To improve the accuracy of speech recognition, an HMM model and a DNN model having a powerful characteristic extracting capability can be used to calculate the probability. Other manners may also be used in other implementation manners. For example, the technical solution of the present disclosure can be similarly achieved by using conventional GMM and HMM models to calculate the probability, which also fall within the scope of the present disclosure.

Figure 6:
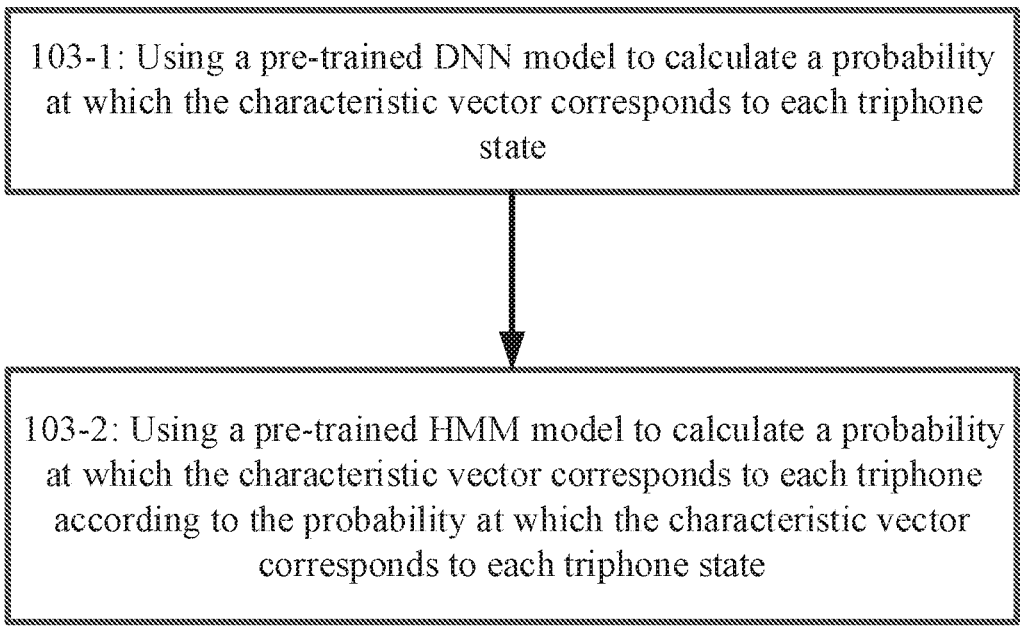
FIG. 6 is a flow chart of a process for calculating a probability at which a characteristic vector corresponds to each triphone according to some embodiments of the present disclosure.

In some implementation, on the basis that calculating the characteristic vector corresponds to each triphone state, a probability at which the characteristic vector corresponds to each triphone is further calculated. The process in this step will be further described below with reference to FIG. 6.

Step 103-1. Using a pre-trained DNN model to calculate a probability at which the characteristic vector corresponds to each triphone state.

In some embodiments, a DNN model has been pre-trained in the preparation phase. This step uses a characteristic vector extracted in the step 102 as an input to the DNN model and can obtain a probability at which the characteristic vector corresponds to each triphone state. For example, the number of triphones is 1000, each triphone comprises 3 states, and then there are a total of 3000 triphone states. The output of the DNN model in this step is: the characteristic vector corresponds to a probability of each state of 3000 triphone states.

In some embodiments, since the amount of computation is usually very high when the DNN model is adopted, the speed of computation with the DNN model can be improved by making use of parallel data processing capability provided by a hardware platform. For example, embedded devices and mobile devices currently use an ARM architecture platform in many cases. On most of the current ARM platforms, there is an SIMD (single instruction multiple data) NEON instruction set. The instruction set can process multiple data in one instruction and has certain parallel data processing capability. In some embodiments, SIMD programming generics can be formed through vectorized programming, and then the parallel data processing capability provided by a hardware platform can be fully used to achieve the goal of accelerating the DNN computation.

When the technical solution of the present disclosure is implemented on a client device, the size of a DNN model would usually be reduced so as to match the hardware capability of the client, which would often lead to decreased accuracy of the DNN model and consequently weakened recognition capability for different speech contents. By using a hardware accelerating mechanism, the size of the DNN model may not need to be reduced or may be reduced by a minimum extend, and therefore can retain the accuracy of the DNN model and improve the recognition accuracy to the greatest degree possible.

Step 103-2. Using a pre-trained HMM model to calculate a probability at which the characteristic vector corresponds to each triphone according to the probability at which the characteristic vector corresponds to each triphone state.

The HMM model for each triphone has been trained in the preparation phase. According to a number of probabilities at which the characteristic vector corresponds to each triphone state that are continuously inputted, this step uses the HMM model to calculate a transition probability corresponds to each triphone, to obtain a probability at which the characteristic vector corresponds to each triphone.

This calculation process may be a process in which a corresponding transition probability is calculated according to the propagation process of a continuous characteristic vector on each HMM. The calculation process will be further described below with calculating a probability for a triphone (having 3 states) as an example, wherein pe(i,j) represents the transmission probability of the characteristic vector of the $i^{th}$ frame on the $j^{th}$ state, and pt(h,k) represents the transition probability from the h state to the k state:

1) the characteristic vector of the $1^{st}$ frame corresponds to the state 1 of a corresponding HMM and has a transmission probability pe(1,1);
2) if the characteristic vector of the $2^{nd}$ frame transitions from the state 1 of the HMM to the state 1, the corresponding probability is pe(1,1)*pt(1,1)*pe(2,1); if transitioning from the state 1 to the state 2, the corresponding probability is pe(1,1)*pt(1,2)*pe(2,2); it is determined according to the above probability whether it transitions to the state 1 or state 2;
3) a calculation method similar to the above is performed for the characteristic vector of the $3^{rd}$ frame and characteristic vectors of subsequent frames until transitioning from the state 3, and till the propagation on this HMM ends, to obtain the probabilities of characteristic vectors of the continuous frames for this HMM, i.e., probabilities corresponding to the triphone characterized by this HMM.

For continuously inputted characteristic vectors, the method above is used to calculate a transition probability of propagation on each HMM and then to obtain a probability corresponding to each triphone.

Step 104. Executing a decoding operation in the search space by using the probability as an input to obtain a word sequence corresponding to the characteristic vector sequence.

A decoding operation is executed in the WFST network, according to the probability at which the characteristic vector corresponds to each triphone as output from the step 103, to obtain a word sequence corresponding to the characteristic vector sequence. This process can be a search process of executing graph search and finding a path with the highest score. The Viterbi algorithm is a common search method and has the advantage of reducing computation load by using the dynamic planning method and can achieve time synchronous decoding.

Considering that the amount of computation with the Viterbi algorithm is still very high due to the huge search space in an actual decoding process, not all possible subsequent paths are developed in the decoding process. Instead, only those paths close to the optimal path are developed so as to reduce computation and improve the computation speed. Namely, in a process of searching by using the Viterbi algorithm, a proper pruning strategy is used to improve the search efficiency. For example, a Viterbi column algorithm or a histogram pruning strategy can be used.

At this moment, a word sequence corresponding to the characteristic vector sequence is obtained through decoding, i.e., a recognition result corresponding to the to-be-recognized speech signal is obtained. Since the preset client information is added when the search space for speech recognition is constructed in the step 101, the speech recognition process above can recognize speech contents related to local information of the client in a relatively accurate manner.

Considering that local information of the client may probably be amended or deleted by a user, the following steps can be implemented to further ensure the accuracy of the word sequence obtained through the above decoding process: verifying the accuracy of the word sequence by performing text matching with the preset client information, and generating a corresponding speech recognition result according to a verification result.

Figure 7:
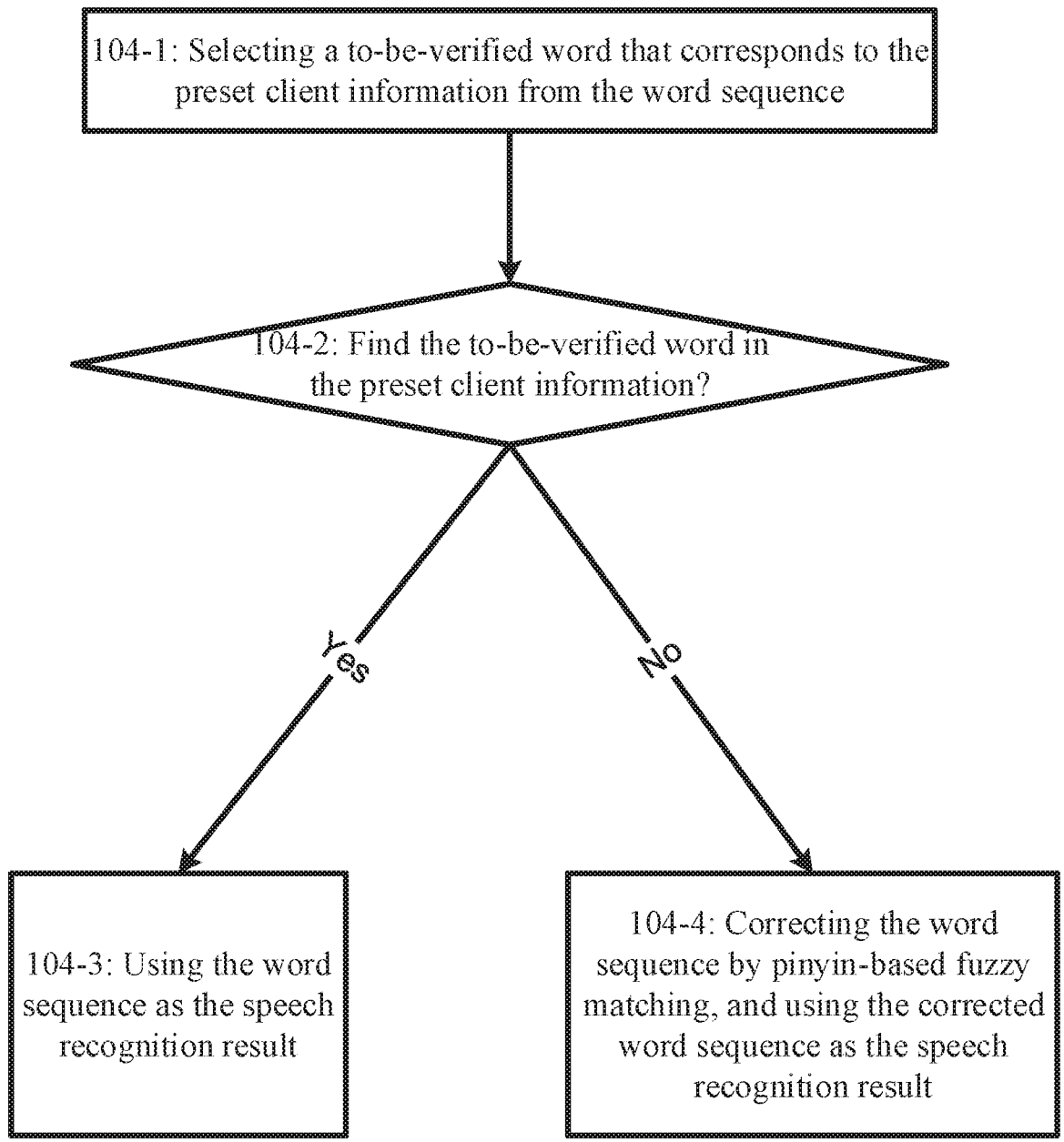
FIG. 7 is a flow chart of a process for verifying the accuracy of a word sequence through text matching, and generating a corresponding speech recognition result according to a verification result according to some embodiments of the present disclosure.

In some implementation, the above steps can comprise step 104-1 to step 104-4 listed below, which will be further described below with reference to FIG. 7.

Step 104-1. Selecting a to-be-verified word that corresponds to the preset client information from the word sequence.

For example, for an application of making phone calls, the preset theme class is "names of contacts in the Contacts," and the speech recognition result is a word sequence of "give Xiao Ming a call." Then, by matching with a template or through a syntactic analysis process, it can be determined that "Xiao Ming" in the word sequence is the to-be-verified word that corresponds to the preset client information.

Step 104-2. Searching for the to-be-verified word in the preset client information; if the to-be-verified word is found, determining that the accuracy verification passes, and executing step 104-3; otherwise, executing step 104-4.

By executing accurate matching at the text level, this step determines whether the to-be-verified word belongs to the corresponding preset client information and then verifies the accuracy of the word sequence.

In the example of the step 104-1, this step searches whether the client Contacts has a contact named "Xiao Ming," i.e., whether the information related to contact names in the Contacts comprises a character string of "Xiao Ming"; if the character string is comprised in the contact names, it is determined that the accuracy verification passes, and step 104-3 is executed; otherwise, step 104-4 is executed.

Step 104-3. Using the word sequence as the speech recognition result.

When this step is executed, it shows that the to-be-verified word comprised in the word sequence obtained through decoding matches the preset client information, and the word sequence can be output as the speech recognition result, thereby triggering an application program that uses the speech recognition result to execute corresponding operations.

Step 104-4. Correcting the word sequence by pinyin-based fuzzy matching (pinyin is an official romanization system for Chinese), and using the corrected word sequence as the speech recognition result.

When this step is executed, it shows that the to-be-verified word comprised in the word sequence obtained through decoding does not match the preset client information. If the word sequence is outputted as the speech recognition result, the relevant application program would usually not be able to execute correct operations. In this case, therefore, necessary corrections can be made to the word sequence through fuzzy matching at the pinyin level.

In some implementation, the above correction function can be achieved in the following manner: by searching in the lexicon, converting the to-be-verified word to a to-be-verified pinyin sequence; converting each word in the preset client information into a comparison pinyin sequence, respectively; then, sequentially calculating a degree of similarity between the to-be-verified pinyin sequence and each comparison pinyin sequence, and selecting a word from the preset client information that is ranked high (e.g., top N, N is a configurable number) after being sorted in a descending order of the degree of similarity; lastly, using the selected word to replace the to-be-verified word in the word sequence to obtain the corrected word sequence.

In some implementation, a degree of similarity between two pinyin sequences can be calculated in various manners. In some embodiments, the degree of similarity is calculated according to an edit distance. For example, the reciprocal of the sum of an edit distance between two pinyin sequences and 1 is used as the degree of similarity. The edit distance refers to the minimum times of editing operations required to transform one character string to another character string, the editing operations comprising replacing one character with another character, inserting a character, and deleting a character. Generally, a smaller edit distance means a higher degree of similarity.

In the example of the step 104-1, the word sequence is "give Xiao Ming a call," and the to-be-verified word is "Xiao Ming." If "Xiao Ming" is not found in the contacts in the client Contacts, then "Xiao Ming" can be converted to a to-be-verified pinyin sequence "xiaoming" by searching in the lexicon, and all contact names in the Contacts are converted to corresponding pinyin sequences, i.e., comparison pinyin sequences; then, the edit distance between "xiaoming" and each comparison pinyin sequence is sequentially calculated, and a contact name corresponding to the comparison pinyin sequence with the shortest edit distance (the highest degree of similarity) (e.g., "Xiao Min" corresponding to "xiaomin") is selected to replace the to-be-verified word in the word sequence, thereby completing the correction to the word sequence, and the corrected word sequence can be used as the final speech recognition result.

In some implementation, a degree of similarity between a to-be-verified pinyin sequence and each comparison pinyin sequence can also be calculated first, and then sorted in a descending order. Words corresponding to a number of (e.g., three) comparison pinyin sequences that are ranked high through sorting are selected, and then these words are prompted to the client user, via screen output or other manners, for the user to select a correct word therefrom. Then, the to-be-verified word in the word sequence is replaced according to the word selected by the user.

Figure 8:
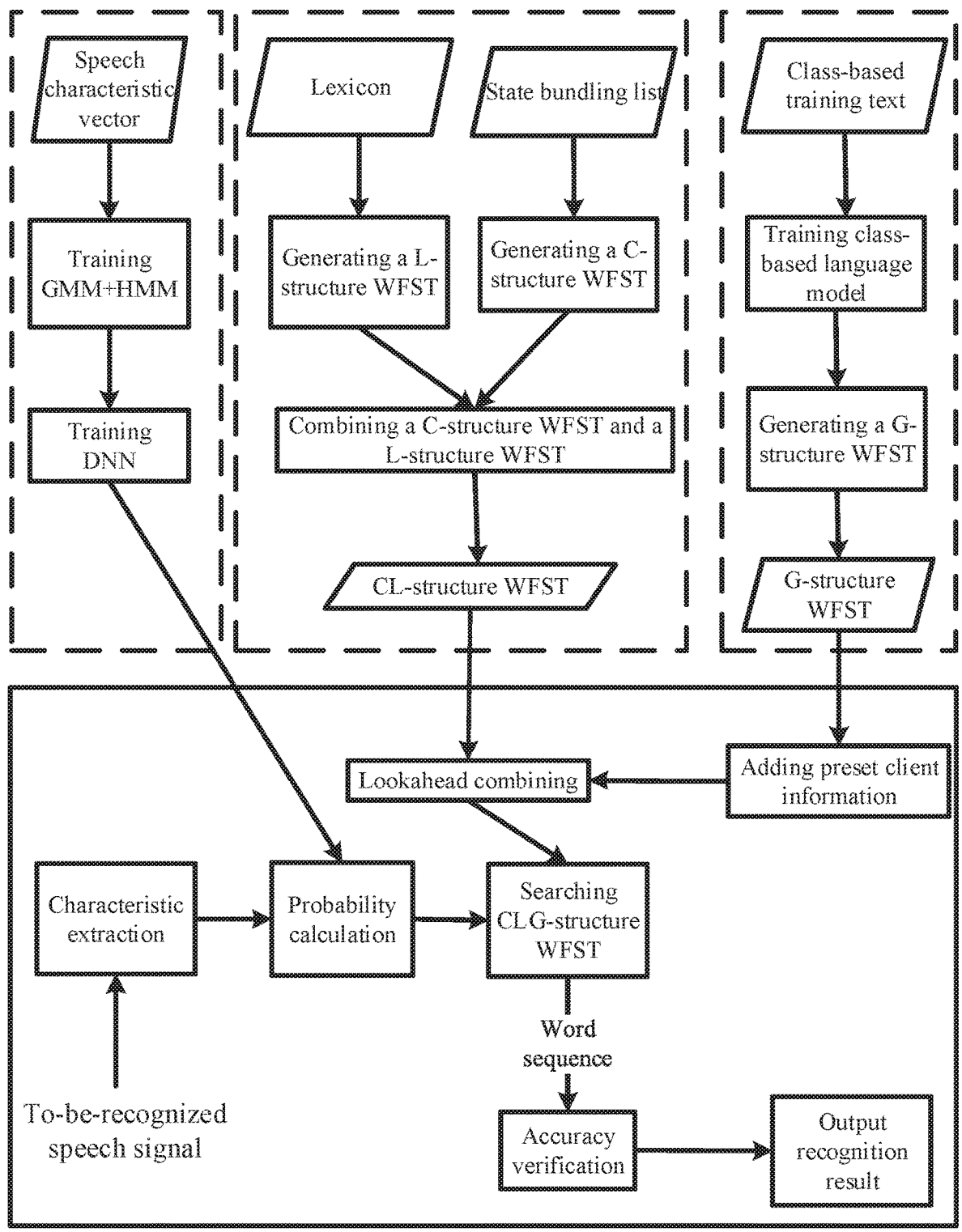
FIG. 8 is an overall block diagram of speech recognition according to some embodiments of the present disclosure.

Speech recognition methods have been described in detail through the above steps 101 to 104. To facilitate the understanding, reference can be made to FIG. 8, which is an overall block diagram of speech recognition consistent with the various embodiments. The dashed line blocks therein correspond to the preparation phase described above, and the solid line block corresponds to the specific speech recognition process.

In some embodiments, the step 101 can be executed every time when a client application program using speech as an interaction medium is started. Namely, a search space comprising preset client information and for decoding a speech signal is generated every time when the application is initiated. Alternatively, the search space can be generated at the first initiation of the client application program and then stored, which can be periodically updated later. In such a manner, the time for generating a search space every time when a client application program is started can be reduced (the previously generated search space can be directly used), and the accuracy of speech recognition and the user experience can be improved.

In addition, the method according to the present disclosure can be implemented on a client device. The client device comprises: a smart mobile terminal, a smart speaker, a robot, or other devices capable of running the method. The present embodiment describes some implementation manner in which the method according to the present disclosure is implemented on a client device. In other implementation manners, however, the method according to the present disclosure can also be implemented in an application scenario based on a client and server mode. In such case, all WFSTs generated in the preparation phase and the models for calculation of acoustic probabilities do not need to be pre-installed into the client device. Every time when the client application is initiated, corresponding preset client information can be uploaded to the server, and the subsequently collected to-be-recognized speech signal is also uploaded to the server. The method according to the present disclosure is implemented at the server side, and the word sequence obtained through decoding is returned to the client, which can also achieve the technical solution of the present disclosure and achieve corresponding beneficial effects.

In summary, since preset client information is comprised when a search space for decoding a speech signal is generated, the speech recognition method according to the present disclosure can recognize information related to local information of the client in a relatively accurate manner when recognizing a speech signal collected by the client. As such, the accuracy of speech recognition and the user experience can be improved.

In particular, the method according to the present disclosure can be applied on a client device for speech recognition. Due to the addition of local information of the client, the issue of decreased recognition accuracy caused by reduced sizes of probability models and of the search space can be addressed to certain degree, which can meet the requirement for speech recognition in an environment with no network access, and also can achieve certain recognition accuracy. Furthermore, after a word sequence is obtained through decoding, the adoption of the matching verification solution at the text level and the pinyin level provided in the present embodiments can further improve the accuracy of speech recognition. The actual testing results show that the character error rate (CER) of a conventional speech recognition method is around 20%, while the method according to the present disclosure has a character error rate below 3%. The data above sufficiently shows that this method has significant advantageous effects.

Figure 9:
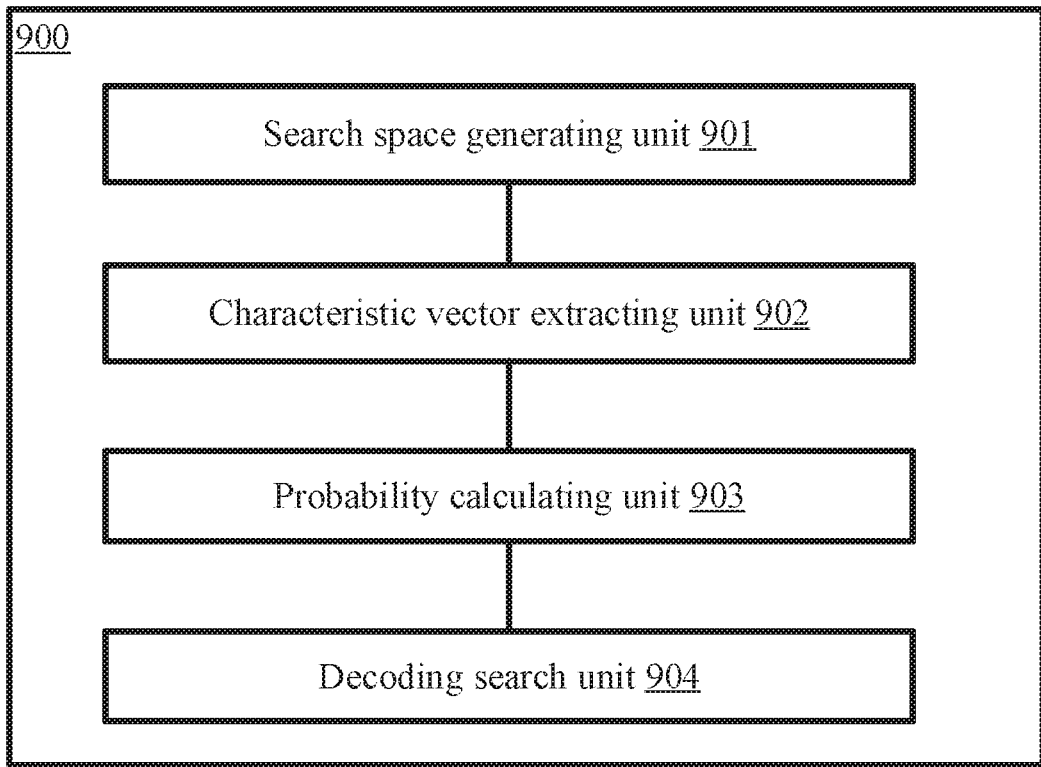
FIG. 9 is a schematic diagram of an exemplary speech recognition apparatus according to the present disclosure.

In the above embodiments, a speech recognition method is provided, corresponding to which the present disclosure further provides speech recognition apparatuses. Referring to FIG. 9, a speech recognition apparatus 900 according to the present disclosure is illustrated. Since the apparatus embodiments are substantially similar to the method embodiments, the description thereof is relatively simple. Any related part can be referred to the description of the part of the method embodiments. The apparatus embodiments described below are merely illustrative.

In some embodiments, the speech recognition apparatus 900 may comprise: a search space generating unit 901 configured to generate, based on a preset speech knowledge source, a search space comprising preset client information and for decoding a speech signal; a characteristic vector extracting unit 902 configured to extract a characteristic vector sequence of a to-be-recognized speech signal; a probability calculating unit 903 configured to calculate a probability at which the characteristic vector corresponds to each basic unit of the search space; and a decoding search unit 904 configured to execute a decoding operation in the search space by using the probability as an input to obtain a word sequence corresponding to the characteristic vector sequence. In some embodiments, the speech recognition apparatus 900 may be implemented as software instructions. That is, the speech recognition apparatus 900 may comprise a processor and a non-transitory computer-readable storage medium storing instructions that, when executed by the processor, cause the device to performed various steps and methods described herein.

Optionally, the search space generating unit is configured to add, by label replacement, preset client information corresponding to a preset theme class into a pre-generated WFST that is at least based on the language model, to obtain a single WFST that is based on a triphone state bundling list, a lexicon, and the language model; the language model is pre-generated by a language model training unit, and the language model training unit is configured to replace a preset name entity in texts for training a language model with a label corresponding to a preset theme class, and use the texts to train the language model.

Optionally, the search space generating unit comprises: a first client information adding sub-unit configured to add, by label replacement, the preset client information corresponding to the preset theme class into a pre-generated WFST that is based on the language model to obtain a WFST added with the preset client information; a WFST combining sub-unit configured to combine the WFST added with the preset client information with a pre-generated WFST that is based on the triphone state bundling list and the lexicon to obtain the single WFST.

Optionally, the search space generating unit comprises: a second client information adding sub-unit configured to add, by label replacement, preset client information corresponding to a preset theme class into a pre-generated WFST that is at least based on the language model; a unified WFST acquiring sub-unit configured to obtain, after the second client information adding sub-unit completes the addition operation, a single WFST that is based on the triphone state bundling list, the lexicon, and the language model.

In some embodiments, the second client information adding sub-unit comprises: a theme determining sub-unit configured to determine a preset theme class to which the to-be-recognized speech signal belongs; a WFST selecting sub-unit configured to select the pre-generated WFST that corresponds to the preset theme class to which the to-be-recognized speech signal belongs and that is at least based on the language model; a label replacing sub-unit configured to add, by replacing a corresponding label with preset client information corresponding to the preset theme class, the preset client information into the selected WFST.

Optionally, the theme determining sub-unit is configured to determine, according to the type of the client or an application program that collects the speech signal, the preset theme class to which the to-be-recognized speech signal belongs.

Optionally, the WFST combining sub-unit is configured to execute the combining operation by using a prediction-based method, and to obtain the single WFST.

Optionally, the probability calculating unit comprises: a triphone state probability calculating sub-unit configured to use a pre-trained DNN model to calculate a probability at which the characteristic vector corresponds to each triphone state; a triphone probability calculating sub-unit configured to use a pre-trained HMM model to calculate a probability at which the characteristic vector corresponds to each triphone according to the probability at which the characteristic vector corresponds to each triphone state.

Optionally, the characteristic vector extracting unit comprises: a frame dividing sub-unit configured to perform frame-dividing processing on the to-be-recognized speech signal according to a preset frame length to obtain a plurality of audio frames; a characteristic extracting sub-unit configured to extract a characteristic vector of each audio frame to obtain the characteristic vector sequence.

Optionally, the apparatus comprises: an accuracy verifying unit configured to verify, after the decoding search unit obtains a word sequence corresponding to the characteristic vector sequence, the accuracy of the word sequence by performing text matching with the preset client information, and to generate a corresponding speech recognition result according to a verification result.

Optionally, the accuracy verifying unit comprises: a to-be-verified word selecting sub-unit configured to select a to-be-verified word that corresponds to the preset client information from the word sequence; a searching sub-unit configured to search for the to-be-verified word in the preset client information; a recognition result determining sub-unit configured to determine, when the searching sub-unit finds the to-be-verified word, that the accuracy verification passes, and use the word sequence as the speech recognition result; a recognition result correcting sub-unit configured to correct, when the searching sub-unit does not find the to-be-verified word, the word sequence by pinyin-based fuzzy matching, and to use the corrected word sequence as the speech recognition result.

Optionally, the recognition result correcting sub-unit comprises: a to-be-verified pinyin sequence converting sub-unit configured to convert the to-be-verified word to a to-be-verified pinyin sequence; a comparison pinyin sequence converting sub-unit configured to convert each word in the preset client information into a comparison pinyin sequence, respectively; a degree of similarity calculating sub-unit configured to sequentially calculate a degree of similarity between the to-be-verified pinyin sequence and each comparison pinyin sequence, and select a word from the preset client information that is ranked high after being sorted in a descending order of the degree of similarity; a to-be-verified word replacing sub-unit configured to use the selected word to replace the to-be-verified word in the word sequence to obtain the corrected word sequence.

Figure 10:
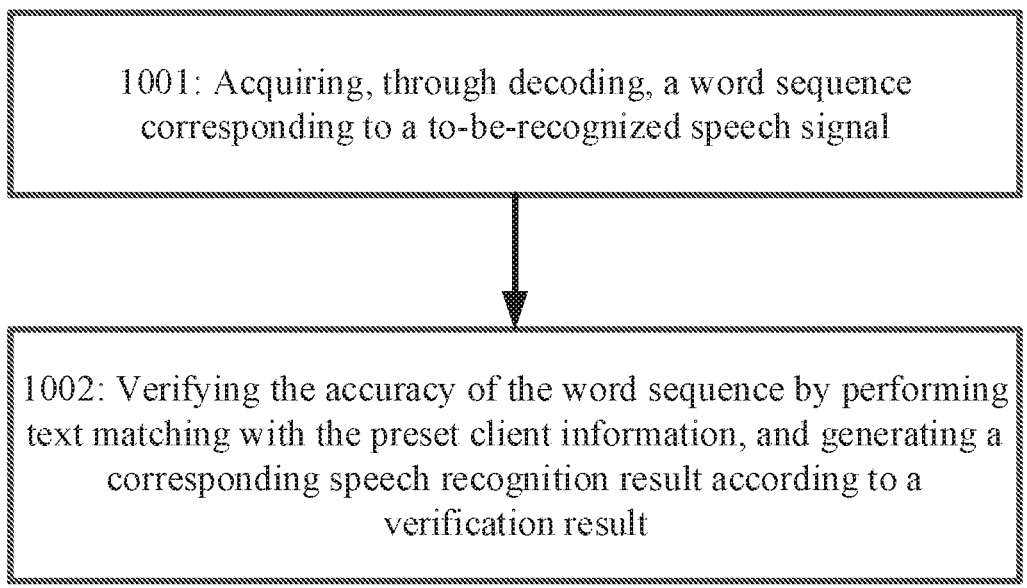
FIG. 10 is a flow chart of another exemplary speech recognition method according to the present disclosure.

Furthermore, the present disclosure provides another speech recognition method. Referring to FIG. 10, a flow chart of an exemplary speech recognition method according to the present disclosure is illustrated. The parts of the present embodiment that have the same content as the method embodiments described above will not be described. The description below will be focused on the differences thereof. Another speech recognition method according to the present disclosure comprises:

Step 1001. Acquiring, through decoding, a word sequence corresponding to a to-be-recognized speech signal.

For speech recognition, the decoding process is a process of searching in a search space for speech recognition to acquire the optimal word sequence corresponding to a to-be-recognized speech signal. The search space can be a WFST network based on various knowledge sources, or search spaces in other forms; the search space may or may not comprise preset client information, which is not specifically defined in the present embodiment.

Step 1002. Verifying the accuracy of the word sequence by performing text matching with the preset client information, and generating a corresponding speech recognition result according to a verification result.

This step may comprise the following operations: selecting a to-be-verified word that corresponds to the preset client information from the word sequence; searching for the to-be-verified word in the preset client information; if the to-be-verified word is found, determining that the accuracy verification passes, and using the word sequence as the speech recognition result; otherwise, correcting the word sequence by pinyin-based fuzzy matching, and using the corrected word sequence as the speech recognition result.

The correcting the word sequence by pinyin-based fuzzy matching may comprise: converting the to-be-verified word to a to-be-verified pinyin sequence; converting each word in the preset client information into a comparison pinyin sequence, respectively; sequentially calculating a degree of similarity between the to-be-verified pinyin sequence and each comparison pinyin sequence, and selecting a word from the preset client information that is ranked high after being sorted in a descending order of the degree of similarity; using the selected word to replace the to-be-verified word in the word sequence to obtain the corrected word sequence.

Here, the converting to a pinyin sequence can be achieved by searching a lexicon, and the degree of similarity can be calculated according to an edit distance between two pinyin sequences.

The method according to the present disclosure can be applied in application programs that use speech as an interaction medium. A to-be-recognized speech collected by this type of application programs may involve client information, while the method according to the present disclosure can verify the accuracy of a word sequence obtained through decoding by performing text matching between the word sequence and the preset client information, which provides evidence for making necessary corrections to the word sequence. Furthermore, the word sequence can be corrected through fuzzy matching at the pinyin level, thereby improving the accuracy of speech recognition.

Figure 11:
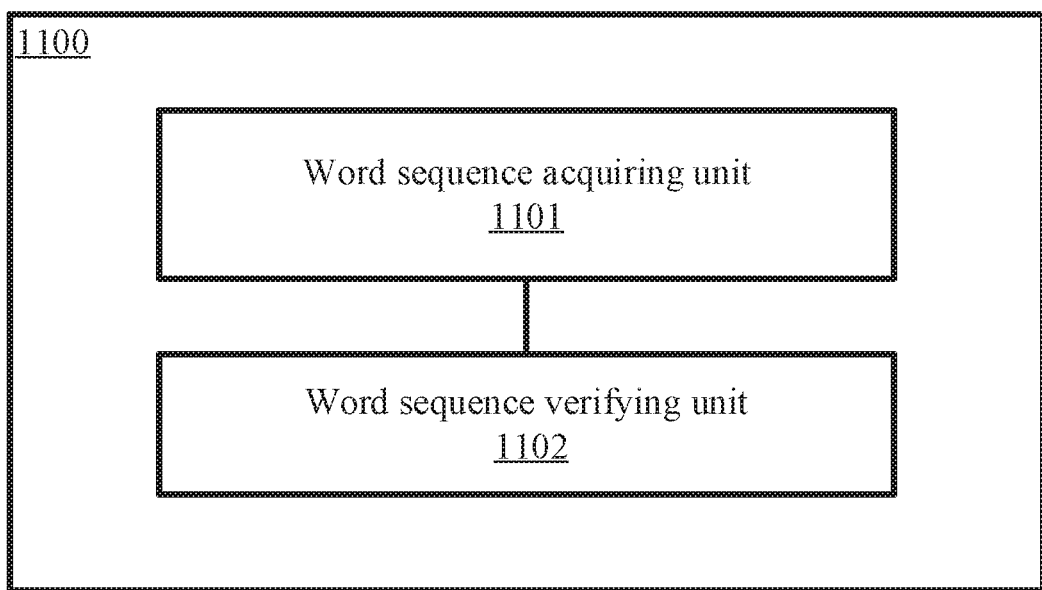
FIG. 11 is a schematic diagram of another exemplary speech recognition apparatus according to the present disclosure.

Another speech recognition method is provided in the embodiment above, corresponding to which the present disclosure further provides another speech recognition apparatus. Referring to FIG. 11, a schematic diagram of an embodiment of another speech recognition apparatus 1100 according to the present disclosure is illustrated. Since the apparatus embodiment is substantially similar to the method embodiment, the description thereof is relatively simple. Any related part can be referred to the description of the part of the method embodiment. The apparatus embodiment described below is merely illustrative.

In some embodiments, the speech recognition apparatus 1100 may comprise: a word sequence acquiring unit 1101 configured to acquire, through decoding, a word sequence corresponding to a to-be-recognized speech signal; a word sequence verifying unit 1102 configured to verify the accuracy of the word sequence by performing text matching with the preset client information, and to generate a corresponding speech recognition result according to a verification result. In some embodiments, the speech recognition apparatus 1100 may be implemented as software instructions. That is, the speech recognition apparatus 1100 may comprise a processor and a non-transitory computer-readable storage medium storing instructions that, when executed by the processor, cause the device to performed various steps and methods described herein.

Optionally, the word sequence verifying unit comprises: a to-be-verified word selecting sub-unit configured to select a to-be-verified word that corresponds to the preset client information from the word sequence; a searching sub-unit configured to search for the to-be-verified word in the preset client information; a recognition result determining sub-unit configured to determine, when the searching sub-unit finds the to-be-verified word, that the accuracy verification passes, and use the word sequence as the speech recognition result; a recognition result correcting sub-unit configured to correct, when the searching sub-unit does not find the to-be-verified word, the word sequence by pinyin-based fuzzy matching, and to use the corrected word sequence as the speech recognition result.

Optionally, the recognition result correcting sub-unit comprises: a to-be-verified pinyin sequence converting sub-unit configured to convert the to-be-verified word to a to-be-verified pinyin sequence; a comparison pinyin sequence converting sub-unit configured to convert each word in the preset client information into a comparison pinyin sequence, respectively; a degree of similarity calculating sub-unit configured to sequentially calculate a degree of similarity between the to-be-verified pinyin sequence and each comparison pinyin sequence, and select a word from the preset client information that is ranked high after being sorted in a descending order of the degree of similarity; a to-be-verified word replacing sub-unit configured to use the selected word to replace the to-be-verified word in the word sequence to obtain the corrected word sequence.

The present disclosure above includes preferred embodiments, which, however, are not used to limit the present disclosure. Any person skilled in the art may make possible variations and modifications without departing from the spirit and scope of the present disclosure. Therefore, the scope of the present disclosure shall be subject to the scope defined by the claims of the present disclosure.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

A person skilled in the art should understand that the embodiments of the present disclosure may be provided as methods, systems, or computer program products. Therefore, the present disclosure may implement a complete hardware embodiment, a complete software embodiment, or an embodiment combining software and hardware. Moreover, the present disclosure may be in the form of a computer program product implemented on one or more computer usable storage media (including, but not limited to, a magnetic disk memory, CD-ROM, an optical memory, and the like) comprising computer usable program codes therein.

What is claimed is:

1. A method, comprising:
    acquiring, through decoding, a word sequence corresponding to a speech signal; and
    verifying the accuracy of the word sequence and generating a speech recognition result by performing operations comprising:
        selecting from the word sequence a first word that corresponds to client information;
        searching for the first word in the client information;
        if the first word is found in the client information, using the word sequence as the speech recognition result; and
        if the first word is not found in the client information, correcting the word sequence by pinyin-based fuzzy matching, and using the corrected word sequence as the speech recognition result.

2. The method of claim 1, wherein correcting the word sequence by pinyin-based fuzzy matching comprises:
    converting the first word to a first pinyin sequence;
    converting multiple words in the client information into multiple comparison pinyin sequences, respectively;
    calculating a degree of similarity between the first pinyin sequence and each of the comparison pinyin sequences;
    selecting, based on the calculated degrees of similarity, a second word from the client information; and
    replacing, using the second word selected from the client information, the first word in the word sequence to obtain the corrected word sequence.

3. The method of claim 2, wherein selecting, based on the calculated degrees of similarity, the second word from the client information, comprises:
    determining, based on the calculated degrees of similarity, the comparison pinyin sequence having the highest calculated degree of similarity to the first pinyin sequence; and
    selecting the second word corresponding to the comparison pinyin sequence having the highest calculated degree of similarity.

4. The method of claim 2, wherein calculating the degree of similarity between the first pinyin sequence and each of the comparison pinyin sequences, comprises: determining an edit distance between the first pinyin sequence and each of the comparison pinyin sequences.

5. The method of claim 2, wherein selecting, based on the calculated degrees of similarity, the second word from the client information, comprises:
sorting the comparison pinyin sequences in descending order according to the calculated degrees of similarity;
selecting at least two words corresponding to at least two comparison pinyin sequences that are ranked highest after sorting the comparison pinyin sequences in the descending order, the at least two words comprising the second word;
presenting the at least two words via a client for user selection; and
after presenting the at least two words, receiving user input selecting the second word.

6. The method of claim 1, wherein acquiring, through decoding, the word sequence corresponding to the speech signal, comprises: searching in a search space comprising the client information for an optimal word sequence corresponding to the speech signal.

7. The method of claim 1, wherein acquiring the word sequence corresponding to the speech signal, comprises:
extracting a characteristic vector sequence of the signal, the characteristic vector sequence comprising a sequence of characteristic vectors;
calculating a probability at which a first characteristic vector of the characteristic vectors corresponds to each of the basic units of a search space comprising the client information; and
executing a decoding operation in the search space by using the probability as an input to obtain the word sequence corresponding to the characteristic vector sequence.

8. The method of claim 7, further comprising: generating, based on a speech knowledge source, the search space comprising the client information, the speech knowledge source comprising: a lexicon, a language model, and a triphone state bundling list.

9. The method of claim 8, wherein the search space comprises: a weighted finite state transducer (WFST) that is based on the triphone state bundling list, the lexicon, and the language model, wherein generating the search space comprises: obtaining the WFST by adding, by label replacement, the preset client information into a pre-generated WFST that is at least based on the language model.

10. The method of claim 1, wherein the client information corresponds to a theme class, wherein the theme class comprises: making a phone call, sending a text message, playing a song, or setting an instruction; and the corresponding client information comprises: names of contacts, names of songs in a song library, or instructions in an instruction set.

11. One or more non-transitory computer-readable mediums storing instructions executable by one or more processors, wherein execution of the instructions cause the one or more processors to perform operations comprising:
acquiring, through decoding, a word sequence corresponding to a speech signal; and
verifying the accuracy of the word sequence and generating a speech recognition result by performing operations comprising:
selecting from the word sequence a first word that corresponds to client information;
searching for the first word in the client information;
if the first word is found in the client information, using the word sequence as the speech recognition result; and
if the first word is not found in the client information, correcting the word sequence by pinyin-based fuzzy matching, and using the corrected word sequence as the speech recognition result.

12. The one or more non-transitory computer-readable mediums of claim 11, wherein correcting the word sequence by pinyin-based fuzzy matching comprises:
converting the first word to a first pinyin sequence;
converting multiple words in the client information into multiple comparison pinyin sequences, respectively;
calculating a degree of similarity between the first pinyin sequence and each of the comparison pinyin sequences;
selecting, based on the calculated degrees of similarity, a second word from the client information; and
replacing, using the second word selected from the client information, the first word in the word sequence to obtain the corrected word sequence.

13. The one or more non-transitory computer-readable mediums of claim 12, wherein selecting, based on the calculated degrees of similarity, the second word from the client information, comprises:
determining, based on the calculated degrees of similarity, the comparison pinyin sequence having the highest calculated degree of similarity to the first pinyin sequence; and
selecting the second word corresponding to the comparison pinyin sequence having the highest calculated degree of similarity.

14. The one or more non-transitory computer-readable mediums of claim 12, wherein calculating the degree of similarity between the first pinyin sequence and each of the comparison pinyin sequences, comprises: determining an edit distance between the first pinyin sequence and each of the comparison pinyin sequences.

15. The one or more non-transitory computer-readable mediums of claim 12, wherein selecting, based on the calculated degrees of similarity, the second word from the client information, comprises:
sorting the comparison pinyin sequences in descending order according to the calculated degrees of similarity;
selecting at least two words corresponding to at least two comparison pinyin sequences that are ranked highest after sorting the comparison pinyin sequences in the descending order, the at least two words comprising the second word;
presenting the at least two words via a client for user selection; and
after presenting the at least two words, receiving user input selecting the second word.

16. The one or more non-transitory computer-readable mediums of claim 11, wherein acquiring the word sequence corresponding to the speech signal, comprises:
extracting a characteristic vector sequence of the signal, the characteristic vector sequence comprising a sequence of characteristic vectors;
calculating a probability at which a first characteristic vector of the characteristic vectors corresponds to each of the basic units of a search space comprising the client information; and
executing a decoding operation in the search space by using the probability as an input to obtain the word sequence corresponding to the characteristic vector sequence.

17. The one or more non-transitory computer-readable mediums of claim 11, wherein the client information corresponds to a theme class, wherein the theme class comprises: making a phone call, sending a text message, playing a song, or setting an instruction; and the corresponding client information comprises: names of contacts, names of songs in a song library, or instructions in an instruction set.

18. A system, comprising:
one or more processors;
one or more non-transitory computer-readable mediums storing instructions executable by the one or more processors, wherein execution of the instructions cause the one or more processors to perform operations comprising:
acquiring, through decoding, a word sequence corresponding to a speech signal; and
verifying the accuracy of the word sequence and generating a speech recognition result by performing operations comprising:
selecting from the word sequence a first word that corresponds to client information;
searching for the first word in the client information;
if the first word is found in the client information, using the word sequence as the speech recognition result; and
if the first word is not found in the client information, correcting the word sequence by pinyin-based fuzzy matching, and using the corrected word sequence as the speech recognition result.

19. The system of claim 18, wherein correcting the word sequence by pinyin-based fuzzy matching comprises:
converting the first word to a first pinyin sequence;
converting multiple words in the client information into multiple comparison pinyin sequences, respectively;
calculating a degree of similarity between the first pinyin sequence and each of the comparison pinyin sequences;
selecting, based on the calculated degrees of similarity, a second word from the client information; and
replacing, using the second word selected from the client information, the first word in the word sequence to obtain the corrected word sequence.

20. The system of claim 18, wherein the client information corresponds to a theme class, wherein the theme class comprises: making a phone call, sending a text message, playing a song, or setting an instruction; and the corresponding client information comprises: names of contacts, names of songs in a song library, or instructions in an instruction set.

* * * * *